(12) United States Patent
Nagasawa

(10) Patent No.: US 10,914,367 B2
(45) Date of Patent: Feb. 9, 2021

(54) GEAR MEMBER AND METHOD OF MANUFACTURING THE SAME

(71) Applicant: TOYOTA JIDOSHA KABUSHIKI KAISHA, Toyota (JP)

(72) Inventor: Kazuya Nagasawa, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 15/896,821

(22) Filed: Feb. 14, 2018

(65) Prior Publication Data

US 2018/0245679 A1 Aug. 30, 2018

(30) Foreign Application Priority Data

Feb. 24, 2017 (JP) ................ 2017-033252

(51) Int. Cl.
| | |
|---|---|
| *B23F 5/16* | (2006.01) |
| *F16H 55/08* | (2006.01) |
| *F16H 57/04* | (2010.01) |
| *F16H 57/08* | (2006.01) |
| *F16H 1/28* | (2006.01) |

(52) U.S. Cl.
CPC ......... *F16H 55/0873* (2013.01); *B23F 5/163* (2013.01); *F16H 57/0482* (2013.01); *F16H 57/082* (2013.01); *F16H 1/28* (2013.01); *F16H 2057/085* (2013.01)

(58) Field of Classification Search
CPC .... B23F 5/163; B23F 1/04; B23F 5/16; B23F 5/12
See application file for complete search history.

(56) References Cited

U.S. PATENT DOCUMENTS

| | | | |
|---|---|---|---|
| 2011/0268523 A1 | 11/2011 | Heinemann et al. | |
| 2013/0266391 A1 | 10/2013 | Schweiker et al. | |
| 2014/0369777 A1* | 12/2014 | Gareis ................ | B23F 5/16 409/12 |

(Continued)

FOREIGN PATENT DOCUMENTS

| | | |
|---|---|---|
| JP | 2012-240183 A | 12/2012 |
| JP | 2014-506535 A | 3/2014 |
| JP | 2014-100725 A | 6/2014 |

(Continued)

*Primary Examiner* — Alan Snyder
(74) *Attorney, Agent, or Firm* — Oliff PLC

(57) ABSTRACT

A method of manufacturing a gear member formed into a cylindrical shape, the gear member having an internal gear disposed without overlapping the bearing holding portion in an axial direction, the method including: preparing a cylindrical material with a small-diameter cylindrical portion having an inner diameter corresponding to a tooth tip diameter of the internal gear in a tooth width region of the internal gear such that the small-diameter cylindrical portion is extended from the tooth width region toward the one end portion to reach the bearing holding portion; and inserting a skiving cutter from the other end portion side opposite to the one end portion of the cylindrical material to form the internal gear by skiving in the tooth width region of the small diameter cylindrical portion, and terminating the skiving at a halfway position before reaching the bearing holding portion and across the tooth width region.

2 Claims, 6 Drawing Sheets

(56) References Cited

U.S. PATENT DOCUMENTS

2016/0290480 A1   10/2016  Sada et al.
2018/0221976 A1*  8/2018  Yoshinaga .............. B23F 5/163

FOREIGN PATENT DOCUMENTS

| JP | 2014-237185 A | 12/2014 | |
|----|---------------|---------|---|
| JP | 2015-075139 A | 4/2015 | |
| JP | 2015-102193 A | 6/2015 | |
| JP | 2015-202553 A | 11/2015 | |
| WO | WO-2014176169 A2 * | 10/2014 | ............ B23F 21/046 |

* cited by examiner

MATERIAL PROCESSING

TOOTH CREATION (SKIVING)

PROCESSING OF BEARING HOLDING PORTION

GEAR MEMBER AND METHOD OF MANUFACTURING THE SAME

This application claims priority from Japanese Patent Application No. 2017-033252 filed on Feb. 24, 2017, the disclosure of which is herein incorporated by reference in its entirety.

BACKGROUND OF THE INVENTION

1. Field of the Invention

The present invention relates to a gear member having an internal gear and, more particularly, to a technique enabling a reduction in diameter of a bearing holding portion disposed at one axial end portion.

2. Description of the Related Art

A gear member is known that is formed into a cylindrical shape, that has a step-shaped bearing holding portion with an enlarged inner diameter formed at one axial end portion on an inner circumferential surface, and that has an internal gear disposed without overlapping the bearing holding portion in an axial direction. The output member O described in Patent Document 1 is an example thereof, has ball bearings arranged on the inner circumferential side of both axial end portions so that the member is rotatably supported around an axial center, and has a ring gear R of a planetary gear device as an internal gear. Generally, broaching (see Patent Document 2) and shaper processing (see Patent Document 3) are widely known as techniques of creating an internal gear of such a gear member. Additionally, a tooth creating technique using skiving is recently also proposed (see Patent Document 4).

PRIOR ART DOCUMENT

Patent Documents

Patent Document 1: JP-2015-102193A
Patent Document 2: JP-2012-240183A
Patent Document 3: JP-2014-100725A
Patent Document 4: JP-2015-202553A The gear member is provided with a small-diameter cylindrical portion projecting to the inner circumferential side in a portion provided with the internal gear, and the internal gear is formed by broaching, shaper processing, etc. over the entire length of the small-diameter cylindrical portion. Therefore, the bearing holding portion is provided in a portion having a diameter larger than a root diameter of the internal gear, which hinders a reduction in diameter (downsizing) of the bearing and the gear member. To receive a thrust load in the axial direction, the bearing holding portion has a predetermined step difference in the radial direction and is disposed at a predetermined distance from the internal gear in the axial direction. A gear member 100 of FIG. 8 is an example of such a conventional gear member, includes inner circumferential surfaces 104, 106 having a diameter larger than root diameter of a ring gear 102 on both sides of the ring gear 102 serving as the internal gear, and has a pair of bearing holding portions 108, 110 provided at end portions of the inner circumferential surfaces 104, 106. FIG. 8 is a cross-sectional view showing the upper half from a center line O1 of the gear member 100.

On the other hand, as in a gear member 120 of FIG. 9, by disposing a small diameter portion 124 separated by an annular groove 122 from the ring gear 102 and disposing the one bearing holding portion 108 at an end portion of the small diameter portion 124, the diameter of the bearing holding portion 108 can be reduced. In the case of shaper processing, a pinion type cutter can be inserted from the side opposite to the small diameter portion 124 (the right side of FIG. 9) and reciprocated in the axial direction to create the ring gear 102 while discharging chips from the annular groove 122. However, the annular groove 122 must be provided by boring etc. before creating the ring gear 102, which increases the number of processing steps and makes the manufacturing cost higher.

SUMMARY OF THE INVENTION

The present invention was conceived in view of the situations and it is therefore an object of the present invention to enable a reduction in diameter of a bearing holding portion without increasing the number of processing steps of a gear member having an internal gear and the bearing holding portion.

To achieve the above object, a first aspect of the invention provides a method of manufacturing a gear member formed into a cylindrical shape and including a step-shaped bearing holding portion with an enlarged inner diameter at one axial end portion on an inner circumferential surface, the gear member having an internal gear disposed without overlapping the bearing holding portion in an axial direction, the method comprising: a material preparing step of preparing a cylindrical material provided with a small-diameter cylindrical portion having an inner diameter corresponding to a tooth tip diameter of the internal gear in a tooth width region of the internal gear such that the small-diameter cylindrical portion is extended from the tooth width region toward the one end portion to reach the bearing holding portion; and a tooth creating step of inserting a skiving cutter from the other end portion side opposite to the one end portion of the cylindrical material to form the internal gear by skiving in the tooth width region of the small diameter cylindrical portion, and terminating the skiving at a halfway position before reaching the bearing holding portion and across the tooth width region.

A second aspect of the invention provides a gear member formed into a cylindrical shape and comprising a step-shaped bearing holding portion with an enlarged inner diameter at one axial end portion on an inner circumferential surface, the gear member having an internal gear disposed without overlapping the bearing holding portion in an axial direction, wherein the gear member is provided with a small diameter portion having an inner diameter corresponding to a tooth tip diameter of the internal gear in a tooth width region of the internal gear such that the small diameter portion is extended toward the one end portion to reach the bearing holding portion, wherein the internal gear is disposed in the small diameter portion from the other end portion side opposite to the one end portion in the axial direction to a halfway position before reaching the bearing holding portion and across the tooth width region, and wherein in a terminal portion on the bearing holding portion side, the internal gear is provided with a gradually changing portion in which a depth of a tooth groove is smoothly shallowed toward the bearing holding portion.

According to the method of manufacturing the gear member recited in the first aspect of the invention, by inserting the skiving cutter from the other end portion side into the cylindrical material having the small-diameter cylindrical portion provided from the tooth width region of the internal gear to reach the bearing holding portion so as to form the internal gear by skiving in the tooth width region of the small-diameter cylindrical portion, and by terminating the skiving at the halfway position before reaching the bearing holding portion, the internal gear can be created with the predetermined thickness dimension (axial length) left between the internal gear and the bearing holding portion. In this case, since the bearing holding portion has the predetermined step difference in the radial direction from the small-diameter cylindrical portion having the same inner diameter as the tooth tip diameter of the internal gear, the bearing holding portion can be configured to have a small diameter, and therefore, costs can be lowered due to a reduction in diameter of the bearing etc. Since it is not necessary to form an annular groove at a position adjacent to the internal gear (on the tool exit side) as in the case of creating the internal gear by shaper processing, the number of processing steps is reduced, and the terminal portion of the internal gear is cut and finished with a depth of a tooth groove smoothly reduced due to characteristics of skiving, which is more advantageous in terms of strength as compared to the annular groove.

The gear member of the second aspect of the invention is provided with the small diameter portion from the tooth width region of the internal gear to reach the bearing holding portion and has the internal gear formed from the other end portion side of the small diameter portion across the tooth width region to the halfway position before reaching the bearing holding portion, and the gradually changing portion is provided in the distal portion of the internal gear with the depth of the tooth groove being smoothly shallowed. Such a gear member is suitably manufactured by using the method of manufacturing of the first aspect of the invention, and the same effect as the first aspect of the invention can be acquired. Specifically, since the bearing holding portion has the predetermined step difference in the radial direction from the small diameter portion, the bearing holding portion can be configured to have a small diameter, and therefore, costs can be lowered due to a reduction in diameter of the bearing etc. Since no annular groove exists at the position adjacent to the internal gear, the number of processing steps is reduced, and the terminal portion of the internal gear is formed into the gradually changing portion with the depth of the tooth groove smoothly reduced, which is more advantageous in terms of strength as compared to the annular groove.

DESCRIPTION OF THE PREFERRED EMBODIMENTS

Figure 1:
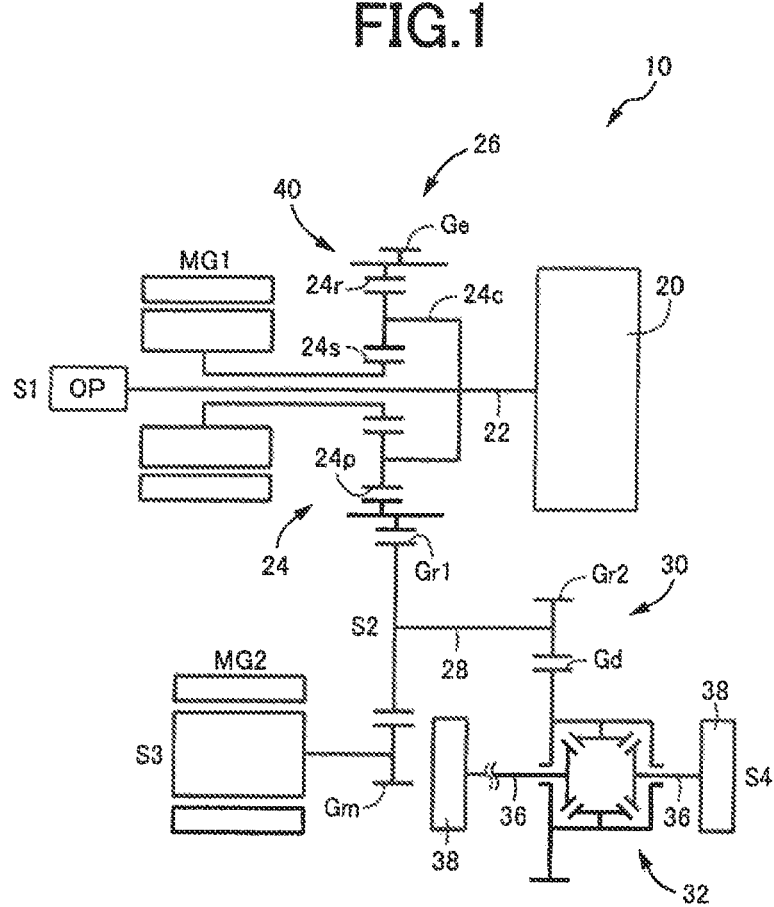
FIG. 1 is a skeleton diagram for explaining a power transmission device for a vehicle including a gear member manufactured according to a method of the present invention.

Although a gear member has a bearing holding portion formed at least at one axial end portion on an inner circumferential surface, bearing holding portions may be formed at both axial end portions on the inner circumferential surface. In this case, for example, by forming an internal gear by skiving such that gradually changing portions are formed on both axial sides of the internal gear with a bottom of a tooth groove smoothly shallowed, the bearing holding portions of both end portions can be configured to have a small diameter; however, the bearing holding portion of one end portion may be configured to have a small diameter, and the bearing holding portion of the other end portion may be formed in an inner circumferential surface portion having a diameter larger than the root diameter of the internal gear. The bearing holding portion of the other end portion can be formed such that the gear member is supported by a bearing from the outer circumferential side.

The gear member has an internal gear formed on the inner circumferential surface, and an external gear may be disposed on its outer circumferential surface as needed. The internal gear is, for example, a ring gear of a planetary gear device used for a power transmission device for a vehicle, or may be a ring gear of a planetary gear device used for a power transmission device for other than a vehicle, or the internal gear may be disposed as a gear other than a ring gear of a planetary gear device. This internal gear may be a spur gear having a tooth trace parallel to a center line of the gear or a helical gear having a tooth trace twisted around the center line.

A small-diameter cylindrical portion of a cylindrical material is provided with an inner diameter dimension equal to the tooth tip diameter of the internal gear, for example, and a tooth groove portion of the internal gear is cut by a skiving cutter to create the internal gear; however, a gear processed portion can be provided with an inner diameter dimension smaller than the tooth tip diameter so as to perform form-cutting of meshing teeth including tips of the meshing teeth of the internal gear by a skiving cutter. The small-diameter cylindrical portion is provided to reach one end portion of the cylindrical material, for example, and the bearing holding portion is formed at the one end portion before or after creation of the internal gear by the skiving cutter; however, the bearing holding portion can be formed before the small-diameter cylindrical portion is formed, and in this case, the small-diameter cylindrical portion may be formed such that the small-diameter cylindrical portion reaches the bearing holding portion.

The gear member in the second aspect of the invention is suitably manufactured by the method in manufacturing of the first aspect of the invention, and the small diameter portion corresponds to the small-diameter cylindrical portion in the first aspect of the invention. The gear member in the second aspect of the invention can be manufactured by a method other than the method of manufacturing in the first aspect of the invention. For example, in the first aspect of the invention, the skiving cutter is inserted from the other end portion side of the cylindrical material to cut the internal gear; however, the skiving cutter may be inserted from one end portion side of the cylindrical member to cut the internal gear, or the internal gear can be processed by using a processing technique other than skiving.

EXAMPLES

Examples of the present invention will now be described in detail with reference to the drawings. In the following examples, the figures are simplified or deformed as needed and portions are not necessarily precisely drawn in terms of dimension ratio, shape, etc.

First Example

FIG. 1 is a skeleton diagram for explaining a power transmission device 10 for a vehicle including a gear member 40 manufactured according to a method of the present invention and is a development diagram showing multiple axes constituting the power transmission device 10 developed and arranged in a common plane. The power transmission device 10 is a transversely-mounted transaxle for a hybrid vehicle such as an FF vehicle in which the multiple axes are arranged along a vehicle width direction, and includes a first axis S1 to a fourth axis S4 as the above-described multiple axes substantially parallel to the vehicle width direction. An input shaft 22 coupled to an engine 20 is disposed on the first axis S1, and a single pinion type planetary gear device 24 and a first motor generator MG1 are arranged concentrically with the first axis S1. The planetary gear device 24 and the first motor generator MG1 function as an electric differential portion 26 and the planetary gear device 24 serving as a differential mechanism has a carrier 24c to which the input shaft 22 is coupled, a sun gear 24s to which the first motor generator MG1 is coupled, and a ring gear 24r provided with an engine output gear Ge. The sun gear 24s and the ring gear 24r are meshed with multiple pinions 24p rotatably disposed on the carrier 24c. The gear member 40 is configured to include the ring gear 24r and the output gear Ge.

The first motor generator MG1 is alternatively used as an electric motor and an electric generator, and rotation speed of the sun gear 24s is continuously controlled through regenerative control when functioning as a generator etc., so that output of the engine 20 is continuously changed in the rotation speed and is output from the engine output gear Ge. When torque of the first motor generator MG1 is set to zero and the sun gear 24s is allowed to idle, the output from the engine 20 is interrupted, and corotation of the engine 20 is prevented during vehicle running. The input shaft 22 is inserted through central portions of the planetary gear device 24 and the first motor generator MG1 and has an axial end portion to which an oil pump OP is coupled. The engine 20 is an internal combustion engine such as a gasoline engine or a diesel engine combusting fuel to generate power.

On the second axis S2, a reduction gear device 30 is provided with a reduction large gear Gr1 and a reduction small gear Gr2 at both ends of a shaft 28, and the reduction large gear Gr1 is meshed with the engine output gear Ge. The reduction large gear Gr1 is also meshed with a motor output gear Gm of a second motor generator MG2 disposed on the third axis S3. The second motor generator MG2 is alternatively used as an electric motor and a generator and is used as a drive power source for running when allowed to function as an electric motor through power running control.

The reduction small gear Gr2 is meshed with a differential ring gear Gd of a differential device 32 disposed on the fourth axis S4, and drive power from the engine 20 and the second motor generator MG2 is distributed through the differential device 32 to left and right drive shafts 36 and transmitted to right and left drive wheels 38.

Figure 2:
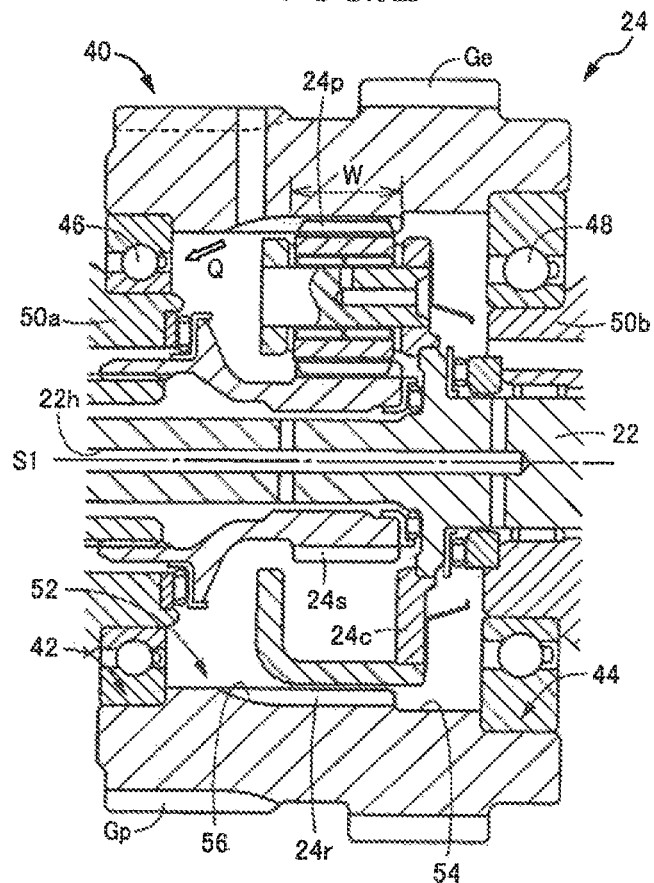
FIG. 2 is a cross-sectional view for explaining a specific structure near a planetary gear device of the power transmission device of FIG. 1.
Figure 3:
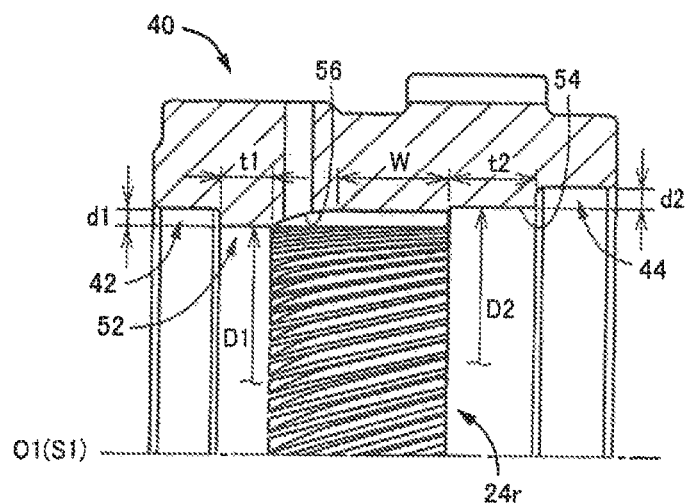
FIG. 3 is a cross-sectional view separately showing the gear member provided with a ring gear of the planetary gear set of FIG. 2 and is a view showing the upper half of the center line O1.

FIG. 2 is a cross-sectional view specifically showing an arrangement near the planetary gear device 24 of the power transmission device 10 of FIG. 1, and FIG. 3 is a cross-sectional view separately showing the gear member 40 provided with the ring gear 24r of the planetary gear device 24 and the engine output gear Ge and is a view showing the upper half of a center line O1. Reference numeral Gp of the gear member 40 shown in FIG. 2 denotes a parking gear. The gear member 40 has a cylindrical shape and a pair of bearing holding portions 42, 44 formed at both axial end portions on an inner circumferential surface, and is rotatably supported around the first axis S1 by case members 50a, 50b via a pair of bearings (in FIG. 2, ball bearings) 46, 48. The case members 50a, 50b are constituent parts of a transaxle case housing the power transmission device 10 and are integrally fixed to each other by multiple bolts etc. Each of the bearing holding portions 42, 44 forms a stepped shape with an enlarged inner diameter and receives a load in a thrust direction applied from the bearings 46, 48 with an end surface of a stepped portion thereof. Specifically, both the ring gear 24r and the engine output gear Ge are helical gears having meshing teeth twisted around the center line O1 so that a thrust load is generated when a meshing reaction force is applied to the gear member 40, and the thrust load is received by the bearings 46, 48, so that the reaction force of the thrust load is applied from the bearings 46, 48 to the bearing holding portions 42, 44. Therefore, the bearing holding portions 42, 44 require predetermined step differences d1, d2 in the radial direction and a predetermined thickness in the axial direction, and are separated by predetermined thickness dimensions t1, t2 in the axial direction from the ring gear 24r. The ring gear 24r corresponds to an internal gear and is disposed without overlapping the pair of the bearing holding portions 42, 44 in the axial direction at an intermediate position between the pair of the bearing holding portions 42, 44.

An inner circumferential portion of the gear member 40 is provided with a small diameter portion 52 on one end portion side provided with the one bearing holding portion 42 and a large diameter portion 54 on the other end portion side provided with the other bearing holding portion 44. The small diameter portion 52 has an inner diameter smaller than the large diameter portion 54 and is a portion projected by a predetermined dimension from the large diameter portion 54 to the inner circumferential side so as to form the ring gear 24r. Therefore, an inner diameter D1 of the small diameter portion 52 is the same as a tooth tip diameter of the ring gear 24r, and an inner diameter D2 of the large diameter portion 54 is larger than a groove bottom diameter of the ring gear 24r. The small diameter portion 52 includes a tooth width region W adjacent to the large diameter portion 54 and extends across the tooth width region W toward the one end portion side to reach the bearing holding portion 42, and the one bearing holding portion 42 is formed continuously with an axial end portion of the small diameter portion 52. The other bearing holding portion 44 is formed continuously with an axial end portion of the large diameter portion 54.

The tooth width region W is a portion provided with the ring gear 24r meshed with the pinions 24p and has a length dimension such that a predetermined meshing strength is acquired. The ring gear 24r is formed to include the tooth width region W from the other axial end portion side of the small diameter portion 52, i.e., from the large diameter portion 54 side and extends, in this example, across the tooth width region W to a halfway position before reaching the bearing holding portion 42, or specifically, to a position at which the thickness dimension t1 of the small diameter portion 52 is left unprocessed. Additionally, in a terminal portion on the bearing holding portion 42 side of the ring gear 24r, i.e., in a portion closer than the tooth width region W to the bearing holding portion 42, a gradually changing portion 56 is formed with a depth of a tooth groove smoothly shallowed in a circular arc shape toward the bearing holding portion 42. In the tooth width region W, the tooth grooves of the ring gear 24r are formed at a substantially constant groove bottom diameter.

Figure 4A:
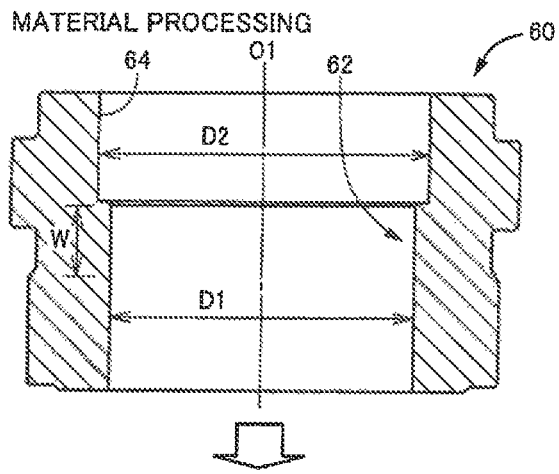
FIGS. 4A to 4C are views for explaining an example of a manufacturing step of the gear member of FIG. 3.
Figure 4B:
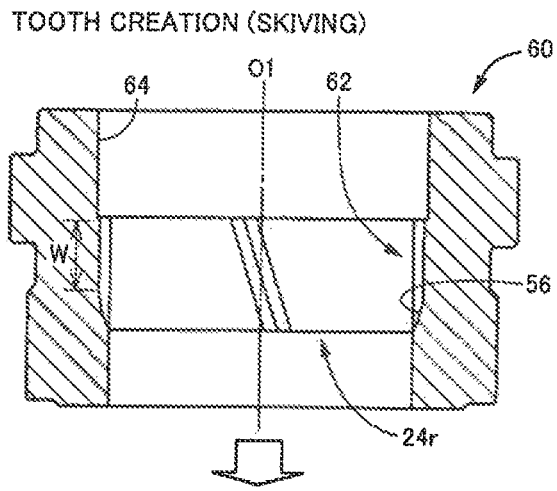
Figure 4C:
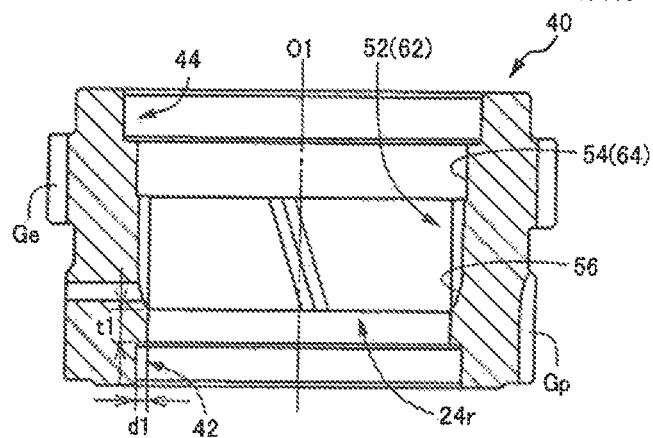

FIGS. 4A to 4C are schematic cross-sectional views for explaining an example of a processing method of the ring gear 24r including the gradually changing portion 56. FIG. 4A shows a material preparing step of preparing a cylindrical material 60 having a small-diameter cylindrical portion 62 formed in the tooth width region W for the ring gear 24r on the inner circumferential surface such that the small-diameter cylindrical portion 62 is extended from the tooth width region W to the one end portion side (the lower side of the figure) to reach the bearing holding portion 42. Although being disposed to include a portion provided with the bearing holding portion 42 and reach the one end portion in this example, the small-diameter cylindrical portion 62 may be formed to reach at least a portion provided with the bearing holding portion 42. An inner diameter of this small-diameter cylindrical portion 62 is set to a diameter dimension equal to the inner diameter D1 of the small diameter portion 52, i.e., the tooth tip diameter of the ring gear 24r. Additionally in this example, a large-diameter cylindrical portion 64 equal to the inner diameter D2 is formed on the other end portion side (the upper side of the figure) relative to the tooth width region W to include the portion provided with the bearing holding portion 42 and reach the other end portion.

Figure 5:
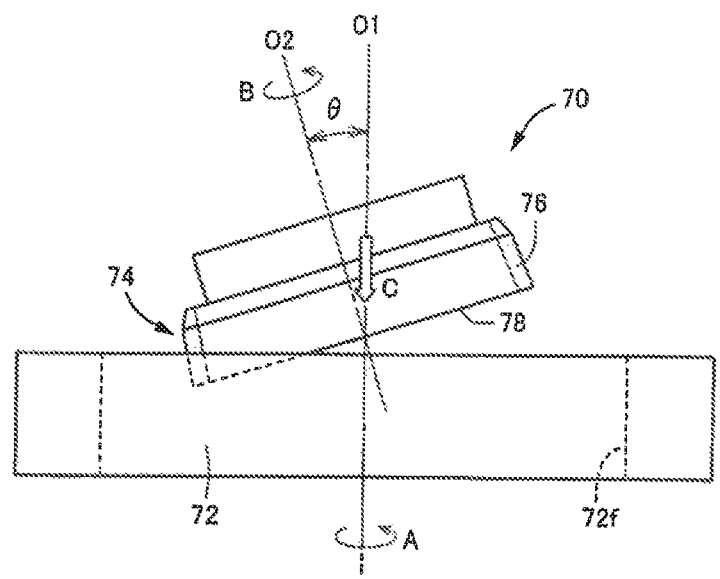
FIG. 5 is a front view for explaining an example of skiving for creating an internal gear in a tooth creating step of FIG. 4B.
Figure 6:
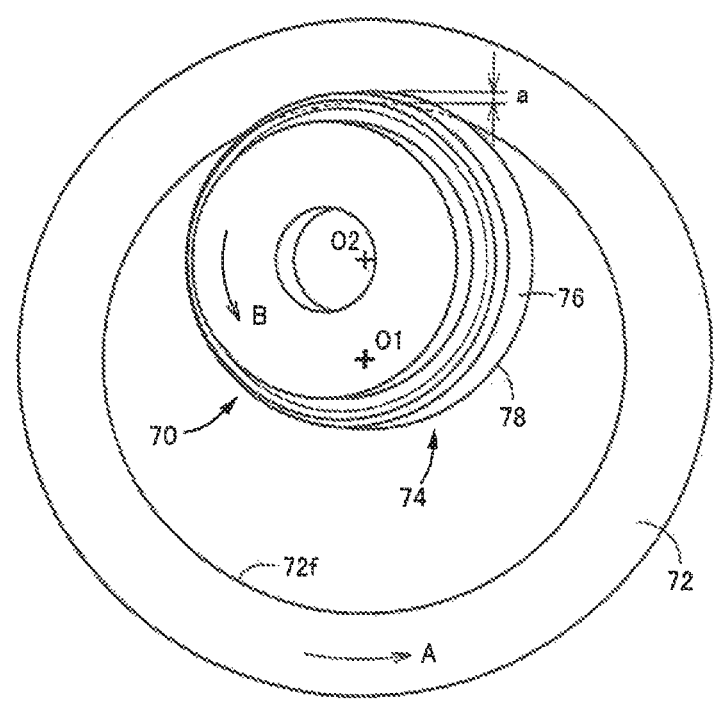
FIG. 6 is a plane view of the skiving of FIG. 5.

FIG. 4B shows a tooth creating step of forming the ring gear 24r in the small-diameter cylindrical portion 62 and, in this example, the ring gear 24r is formed by skiving. FIG. 5 is a schematic front view for explaining the skiving and FIG. 6 is a plane view viewed from above in FIG. 5 and shows the case of processing an internal gear on an inner circumferential surface 72f of a cylindrical workpiece 72 by a skiving cutter 70. The cylindrical workpiece 72 corresponds to the cylindrical material 60. The skiving cutter 70 includes a tapered blade portion 74 having a diameter made larger toward the tip side, and is provided with a multiplicity of processing teeth 76 having a cross-sectional shape corresponding to the tooth grooves of the internal gear to be processed on an outer circumferential surface of the blade portion 74, and a cutting edge 78 at the tips of the processing teeth 76. An outer diameter dimension of the cutting edge 78 is sufficiently smaller than an inner diameter dimension of the cylindrical workpiece 72 so that the skiving cutter 70 can be inserted inside the cylindrical workpiece 72.

At the time of skiving, first, a center line (rotation axis) O2 of the skiving cutter 70 is inclined relative to the center line O1 of the cylindrical workpiece 72 at a predetermined inclination angle θ in a circumferential direction of the cylindrical workpiece 72 (leftward direction in FIG. 6), and the cutting edge 78 is arranged to cut in at a predetermined cutting depth a in a radial direction of the cylindrical workpiece 72. The cutting depth a coincides with the teeth depth of the meshing teeth of the internal gear (the ring gear 24r in this example) to be processed. Subsequently, while synchronously rotating the cylindrical workpiece 72 and the skiving cutter 70 around the respective center lines O1, O2, the skiving cutter 70 is moved for feeding in a direction parallel to the center line O1 of the cylindrical workpiece 72 as indicated by an arrow C of FIG. 5, so that the intended internal gear can continuously be processed on the inner circumferential surface 72f. A rotation direction A of the cylindrical workpiece 72 and a rotation direction B of the skiving cutter 70 are the same direction, which is the counterclockwise direction in the plane view of FIG. 6 in this example and, since the skiving cutter 70 is inclined in the leftward direction at the inclination angle θ, the cutting edge 78 cuts in the axial direction of the cylindrical workpiece 72 (downward in FIG. 5) as the skiving cutter 70 rotates, so that cutting is performed in the inner circumferential surface 72f. The inclination angle θ affects the cutting performance of the cutting edge 78 and is appropriately determined to achieve a predetermined cutting performance. A center point O2 of the skiving cutter 70 indicated by "+" in FIG. 6 is the center of the blade portion 74 at the tip position thereof, i.e., the center position of the cutting edge 78, and the cutting depth a is set on a straight line connecting the center line O1 of the cylindrical workpiece 72 and the center point O2. The cutting depth a is smaller than the height dimension of the processing teeth 76, and the inner circumferential surface 72f directly serves as the tooth tips of the internal gear, so that the inner diameter of the inner circumferential surface 72f is the tooth tip diameter of the internal gear.

The internal gear to be processed may have meshing teeth that are twisted teeth twisted around the center line O1 at a helix angle β1 or that are parallel teeth parallel to the center line O1 having the helix angle β1=0°. The processing teeth 76 of the skiving cutter 70 may be twisted teeth twisted around the center line O2 at a helix angle β2 or parallel teeth parallel to the center line O2 having the helix angle (32=0°. For example, assuming that a clockwise twist is positive (+), these helix angles β1, β2 are determined such that Eq. (1) below is satisfied. For example, when the helix angle β1 of the internal gear to be processed is 17° and the inclination angle θ is set to 22', the helix angle β2 of the processing teeth 76 is −5°, and the processing teeth 76 are twisted teeth twisted counterclockwise by 5°. The synchronous rotation of the cylindrical workpiece 72 and the skiving cutter 70 is the rotation causing the cutting edge 78 of the skiving cutter 70 to cut into the cylindrical workpiece 72 at the helix angle β1 and the rotational speeds thereof are set in association with each other. The synchronous rotation is defined by relative rotations of the cylindrical workpiece 72 and the skiving cutter 70 thus, for example, the cylindrical workpiece 72 may be disposed in a positionally fixed manner, and the skiving cutter 70 may be allowed to rotate on its own axis around the center line O2 and concurrently revolved inversely (clockwise) along the inner circumferential surface 72f around the center line O2 of the cylindrical workpiece 72. In short, the internal gear can be processed by applying a conventionally known skiving technique such as that in Patent Document 4 described above.

$$\theta = \beta1 - \oplus 2 \qquad (1)$$

Returning to FIGS. 4A to 4C, at the tooth creating step of FIG. 4B, the skiving cutter 70 is inserted from the other end portion side of the cylindrical material 60 provided with the small-diameter cylindrical portion 62, i.e., from the upper side of FIG. 4B, to form the ring gear 24r in the tooth width region W of the small-diameter cylindrical portion 62 by skiving, and the skiving is terminated at a halfway position before reaching the bearing holding portion 42 across the tooth width region W. Specifically, the skiving is terminated at the position leaving the thickness dimension t1 to the bearing holding portion 42, and the skiving cutter 70 is shifted toward the center of the cylindrical material 60 (i.e., to the lower side in the case of FIG. 6) so that the skiving cutter 70 can be axially taken out from the cylindrical material 60. As a result, the ring gear 24r is created in the small-diameter cylindrical portion 62. In this case, for example, as compared to the shaper processing shown in FIG. 9, since it is not necessary to form an annular groove at a position adjacent to the ring gear 24r (on the tool exit side), the number of processing steps is reduced, and a terminal portion of the ring gear 24r is cut and finished with a depth of a tooth groove smoothly reduced like an arc due to characteristics of skiving, and the gradually changing portion 56 is automatically formed. Specifically, when the skiving is terminated in the middle of the small-diameter cylindrical portion 62, the gradually changing portion 56 having a rotational locus (a curved shape corresponding to the diameter dimension) of the cutting edge 78 of the skiving cutter 70 is formed in the terminal portion.

FIG. 4C shows a bearing holding portion processing step, and the pair of the bearing holding portions 42, 44 is processed by cutting etc. on the cylindrical material 60 provided with the ring gear 24r. Additionally, the engine output gear Ge, the parking gear Gp, an oil hole, etc. are processed by cutting etc. to manufacture the intended gear member 40. One or both of the paired bearing holding portions 42, 44 can be formed before the tooth creating step of FIG. 4B. For example, one or both of the bearing holding portions 42, 44 can be formed between the material preparing step of FIG. 4A and the tooth creating step of FIG. 4B or can be formed in the course of the material preparing step of FIG. 4A. The engine output gear Ge and the parking gear Gp can also be formed before the tooth creating step of FIG. 4B.

As described above, according to the method of manufacturing the gear member 40 of this example, by inserting the skiving cutter 70 from the other end portion side into the cylindrical material 60 having the small-diameter cylindrical portion 62 provided from the tooth width region W of the ring gear 24r to reach the one end portion on the bearing holding portion 42 side so as to form the ring gear 24r by skiving in the tooth width region W of the small-diameter cylindrical portion 62, and by terminating the skiving at the halfway position before reaching the bearing holding portion 42, the ring gear 24r can be created with the predetermined thickness dimension t1 left between the ring gear 24r and the bearing holding portion 42. In this case, since the bearing holding portion 42 has the predetermined step difference d1 in the radial direction from the small-diameter cylindrical portion 62 (the small diameter portion 52) having the same inner diameter as the tooth tip diameter of the ring gear 24r, the bearing holding portion 42 can be configured to have a small diameter, and therefore, costs can be lowered due to a reduction in diameter of the bearing 46 etc., and a rolling length per rotation is shortened so that rotational resistance is reduced, resulting in improved fuel consumption.

Figure 9:
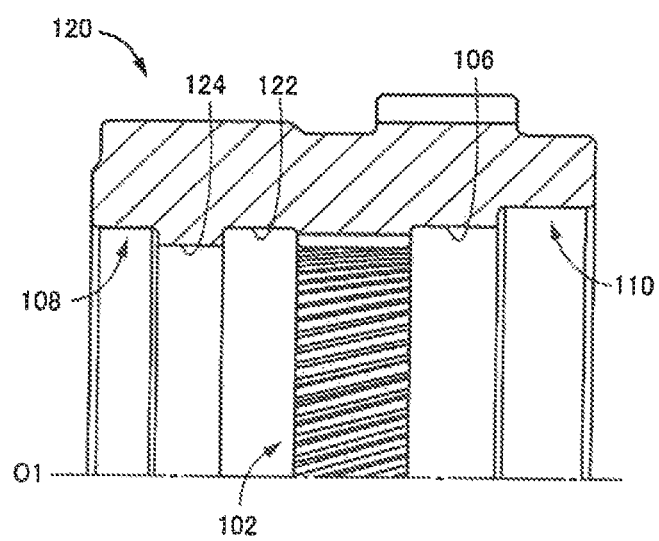
FIG. 9 is a view for explaining another example of a conventional gear member and is a cross-sectional view corresponding to FIG. 3.

Since it is not necessary to provide the annular groove at the position adjacent to the ring gear 24r (on the tool exit side) as compared to the shaper processing shown in FIG. 9, the number of processing steps is reduced, and the gradually changing portion 56 is formed in the terminal portion of the ring gear 24r with the depth of the tooth groove smoothly reduced due to characteristics of skiving, which is more advantageous in terms of strength as compared to the annular groove and, for example, the thickness dimension t1 can be made smaller.

The gear member 40 can achieve the same effects as the manufacturing method described above. Specifically, since the bearing holding portion 42 has the predetermined step difference d1 in the radial direction from the small diameter portion 52 having the same inner diameter as the tooth tip diameter of the ring gear 24r, the bearing holding portion 42 can be configured to have a small diameter. Since no annular groove exists at the position adjacent to the ring gear 24r (on the tool exit side), the number of processing steps is reduced, and the terminal portion of the ring gear 24r is formed into the gradually changing portion 56 with the depth of the tooth groove smoothly reduced, which is more advantageous in terms of strength as compared to the annular groove.

In the gear member 40 of this example, since the other end portion outside of the ring gear 24r, i.e., the other bearing holding portion 44 side, is defined as the large diameter portion 54 having a diameter larger than the groove bottom diameter of the ring gear 24r, the pinions 24p assembled to the carrier 24c can be inserted from the other end portion side into the gear member 40 and meshed with the ring gear 24r, which makes an assembly work of the planetary gear device 24 easy.

As shown in FIG. 2, a lubricating oil supplied to the planetary gear device 24 through an oil supply hole 22h etc. provided in the input shaft 22 and further supplied to the ring gear 24r by a centrifugal force etc. is appropriately allowed to flow toward the bearing 46 as indicated by an arrow Q along the inclination of the gradually changing portion 56 provided in the terminal portion of the ring gear 24r, so that the lubrication efficiency is improved for the bearing 46 etc.

Second Example

Figure 7:
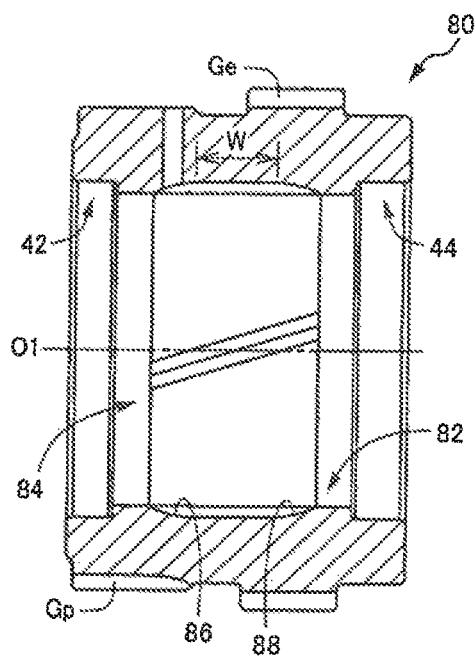
FIG. 7 is a schematic cross-sectional view for explaining another example of the present invention.
Figure 8:
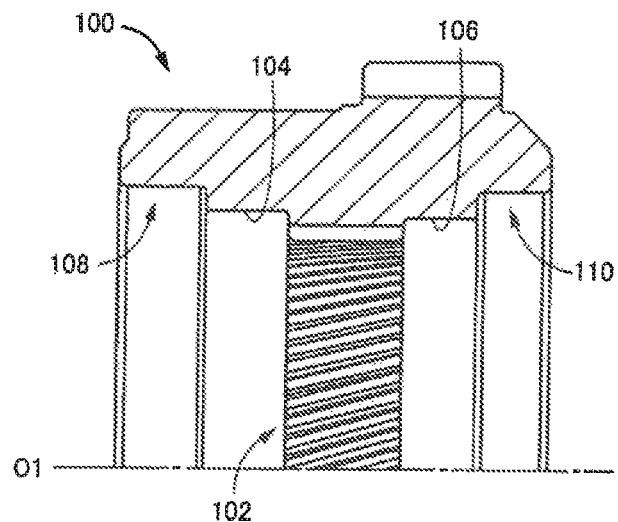
FIG. 8 is a view for explaining an example of a conventional gear member and is a cross-sectional view corresponding to FIG. 3.

In the illustrated first example, the other end portion outside relative to the ring gear 24r, i.e., the other bearing holding portion 44 side, is defined as the large diameter portion 54 having a diameter larger than the groove bottom diameter of the ring gear 24r; however, for example, as in a gear member 80 shown in FIG. 7, the entire area located inside the pair of the bearing holding portions 42, 44 in the axial direction can be defined as a small diameter portion 82, and a ring gear 84 having a tooth tip diameter equal to the inner diameter of the small diameter portion 82 can be provided in the tooth width region W at an intermediate position of the small diameter portion 82. This ring gear 84 can also be processed by using the skiving cutter 70, and a gradually changing portion 86 on the bearing holding portion 42 side is formed by terminating the processing by the skiving cutter 70 at a position before reaching the bearing holding portion 42, as in the gradually changing portion 56. A gradually changing portion 88 on the bearing holding portion 44 side is formed by synchronously rotating the skiving cutter 70 and the cylindrical workpiece 72 as shown in FIGS. 5 and 6, for example, and moving the skiving cutter 70 to the radially outer side of the cylindrical workpiece 72 such that the cutting depth a gradually increases from zero when the skiving cutter 70 is moved for feeding in the direction of the arrow C. Therefore, the inclination shape of the gradually changing portion 88 is determined depending on the feeding speed in the radial direction increasing the cutting depth a.

The gear member 80 according to this example as described above can achieve the same effects as the gear member 40 according to the first example, and additionally, since the paired bearing holding portions 42, 44 are both provided at the end portions of the small diameter portion 82, both of the bearing holding portions 42, 44 can be configured to have a small diameter and, therefore, costs can be lowered due to a reduction in diameter of the bearing 46, 48 etc., and a rolling length per rotation is shortened so that rotational resistance is reduced.

In the description of the examples, the skiving cutter 70 is inserted from the other end portion side of the gear members 40, 80 (the side provided with the bearing holding portion 44) to process the ring gears 24r, 84; however, for both of the gear members 40, 80, the skiving cutter 70 can be inserted from the one end portion side (the side provided with the bearing holding portion 42) to process the ring gears 24r, 84. Specifically, as in the gradually changing portion 88, by moving the skiving cutter 70 to the radially outer side of the cylindrical workpiece 72 such that the cutting depth a gradually increases from zero in FIGS. 5 and 6, the gradually changing portions 56, 86 can be formed to process the ring gears 24r, 84.

Although the examples of the present invention have been described in detail with reference to the drawings, these are merely an embodiment and the present invention can be implemented in variously modified and improved forms based on the knowledge of those skilled in the art.

REFERENCE SIGNS LIST

24r, 84: Ring gear (Internal gear) 40, 80: Gear member 42: Bearing holding portion 52, 82: Small diameter portion 56, 86: Gradually changing portion 60: Cylindrical material 62: Small-diameter cylindrical portion 70: Skiving cutter W: Tooth width region D1: Inner diameter of the small diameter portion (inner diameter of the small-diameter cylindrical portion, tooth tip diameter of the internal gear) d1: Step difference

What is claimed is:

1. A method of manufacturing a gear member formed into a cylindrical shape and including a step-shaped bearing holding portion with an enlarged inner diameter at one axial end portion on an inner circumferential surface of the gear member, the gear member having an internal gear disposed such that the internal gear does not overlap the bearing holding portion in an axial direction, the method comprising:

preparing a cylindrical material provided with a small-diameter cylindrical portion having an inner diameter corresponding to a tooth tip diameter of the internal gear in a tooth width region of the internal gear such that the small-diameter cylindrical portion is extended from the tooth width region toward the one axial end portion to reach the bearing holding portion; and creating a tooth by (i) inserting a skiving cutter from a side of an other axial end portion opposite to the one axial end portion of the cylindrical material to form the internal gear across the tooth width region by skiving in the tooth width region of the small-diameter cylindrical portion, and (ii) terminating the skiving at a halfway position before reaching the bearing holding portion to form a thick-walled portion between a region where the skiving is performed and the bearing holding portion, the thick-walled portion having a thickness that is larger than a thickness of the bearing holding portion in a radial direction of the gear member and having an inner diameter equal to the tooth tip diameter of the internal gear in the tooth width region of the internal gear.

2. A gear member manufactured by the method according to claim 1, the gear member being formed into a cylindrical shape and comprising a step-shaped bearing holding portion with an enlarged inner diameter at one axial end portion on an inner circumferential surface of the gear member, the gear member also having an internal gear disposed such that the internal gear does not overlap the bearing holding portion in an axial direction, wherein the gear member is provided with a small diameter portion having an inner diameter corresponding to a tooth tip diameter of the internal gear in a tooth width region of the internal gear such that the small diameter portion is extended toward the one axial end portion to reach the bearing holding portion, the internal gear is disposed in the small diameter portion from a side of an other axial end portion opposite to the one end portion in the axial direction to a halfway position before reaching the bearing holding portion and across the tooth width region, in a terminal portion on a bearing holding portion side, the internal gear is provided with a gradually changing portion in which a depth of a tooth groove is smoothly shallowed toward the bearing holding portion, and the smaller diameter portion includes a thick-walled portion disposed between the gradually changing portion and the bearing holding portion, the thick-walled portion having a thickness larger than that of the bearing holding portion in a radial direction of the gear member and having an inner diameter equal to the tooth tip diameter of the internal gear in the tooth width region of the internal gear.

* * * * *